(12) United States Patent
Drye et al.

(10) Patent No.: US 9,698,647 B2
(45) Date of Patent: Jul. 4, 2017

(54) ELECTRIC MACHINE WITH MAGNETIC SENSOR

(71) Applicant: Regal Beloit America, Inc., Beloit, WI (US)

(72) Inventors: Edward Lewis Drye, Troy, IN (US); Harold Dean Willis, Cedarburg, WI (US); Stephen Thomas English, Englewood, OH (US); Justin Michael Magyar, Troy, OH (US); Christopher Joseph Roth, Tipp City, OH (US); Alan Michael Smith, Beavercreek, OH (US); Paul Steven Mullin, Yellow Springs, OH (US)

(73) Assignee: Regal Beloit America, Inc., Beloit, WI (US)

(*) Notice: Subject to any disclaimer, the term of this patent is extended or adjusted under 35 U.S.C. 154(b) by 268 days.

(21) Appl. No.: 14/495,924

(22) Filed: Sep. 25, 2014

(65) Prior Publication Data

US 2016/0094110 A1    Mar. 31, 2016

(51) Int. Cl.
| | | |
|---|---|---|
| *H02K 5/15* | (2006.01) | |
| *H02K 11/00* | (2016.01) | |
| *H02K 1/27* | (2006.01) | |
| *H02K 11/215* | (2016.01) | |

(52) U.S. Cl.
CPC ............. *H02K 5/15* (2013.01); *H02K 1/278* (2013.01); *H02K 11/0015* (2013.01); *H02K 11/0021* (2013.01); *H02K 11/215* (2016.01); *H02K 2211/03* (2013.01)

(58) Field of Classification Search
CPC .... H02K 5/15; H02K 11/215; H02K 11/0015; H02K 11/0021; H02K 1/278; H02K 2211/03
USPC ........................................... 310/68 B, 156.05
See application file for complete search history.

(56) References Cited

U.S. PATENT DOCUMENTS

| | | | |
|---|---|---|---|
| 6,016,055 A | 1/2000 | Jager et al. | |
| 6,310,455 B1 | 10/2001 | Siraky et al. | |
| 6,609,595 B2 | 8/2003 | Flynn et al. | |
| 6,969,933 B2 | 11/2005 | Mao et al. | |
| 7,518,273 B2 | 4/2009 | Kataoka et al. | |

(Continued)

FOREIGN PATENT DOCUMENTS

| | | |
|---|---|---|
| CN | 201879774 U | 6/2011 |
| CN | 102761225 A | 10/2012 |

(Continued)

OTHER PUBLICATIONS

Machine translation of DE 9303414 U1 (Jul. 1994).*

(Continued)

*Primary Examiner* — Michael Andrews
(74) *Attorney, Agent, or Firm* — John Wagley

(57) ABSTRACT

According to an embodiment of the invention, an electric machine is provided. The machine includes a support structure and a stator secured to the support structure. The machine also includes a rotor rotatably scoured to the support structure. The rotor defines a wall of the rotor. The machine also includes a sensor secured to the support structure and adapted to cooperate with the wall of the rotor to sense the position of the rotor relative to that of the stator.

5 Claims, 15 Drawing Sheets

(56) References Cited

U.S. PATENT DOCUMENTS

| | | | |
|---|---|---|---|
| 2006/0125334 A1* | 6/2006 | Kataoka | H02K 29/08 310/68 B |
| 2010/0033050 A1* | 2/2010 | Kobayashi | H02K 29/12 310/156.12 |
| 2012/0227722 A1 | 9/2012 | Bell | |

FOREIGN PATENT DOCUMENTS

| | | | |
|---|---|---|---|
| CN | 203439220 U | 2/2014 | |
| DE | 9303414 U1 * | 7/1994 | H02K 29/08 |
| EP | 1838142 B1 | 1/2000 | |
| EP | 1372250 A2 | 12/2003 | |
| GB | 2343791 A | 5/2000 | |
| GB | 2370697 A | 7/2002 | |
| JP | 11201999 A | 7/1999 | |
| JP | 2013096579 A | 5/2013 | |
| KR | 895006 B1 | 4/2009 | |

OTHER PUBLICATIONS

Internet—http://e0designs.com, Equals Zero Designs—Hall Effect Sensor Board & Adapter Installation, World Press.
Internet—http://www.sdsefi.com, Hints on Hall Sensor/Magnet Mounting EM-5 and EM-4, Simple Digital System EM-5.
Internet—http://www.hamlin.com, Hall Sensor Test Geartooth Sensing using 55075 device, Hamlin.
Internet—Hall Sensor Installation.

* cited by examiner

ELECTRIC MACHINE WITH MAGNETIC SENSOR

BACKGROUND OF THE INVENTION

The embodiments described herein relate generally to an electric machine, and more specifically, to an electric machine having a sensor.

An electric machine is typically in the form of an electric generator or an electric motor. The machine typically has a centrally located shaft that rotates relative to the machine. Electrical energy applied to coils within the machine initiates this relative motion which transfers the power to the shaft and, alternatively, mechanical energy from the relative motion of the generator excites electrical energy into the coils. For expediency, the machine will be described hereinafter as a motor. It should be appreciated that a machine may operate as a generator and vice versa.

A stationary assembly, also referred to as a stator, includes a stator core and coils or windings positioned around portions of the stator core. It is these coils to which energy is applied to initiate this relative motion which transfers the power to the shaft. These coils are formed by winding wire, typically copper, aluminum or a combination thereof, about a central core to form the winding or coil. An electric current is directed through the coils which induces a magnetic field. It is the magnetic field that initiates this relative motion which transfers the power to the shaft.

For a variety of reasons including, for example, positioning, speed detection, and current sensing a sensor or transducer is used to determine the position of the rotor relative to the stator. One such sensor used in electric machines is a Hall effect sensor. A Hall effect sensor is a transducer that varies its output voltage in response to a magnetic field. Hall effect sensors are used for proximity switching, positioning, speed detection, and current sensing applications.

In its simplest form, the sensor operates as an analog transducer, directly returning a voltage. With a known magnetic field, its distance from the magnetic field generating component of the rotor, typically a permanent magnet, can be determined. Using groups of sensors, the relative position of the magnet can be deduced.

Hall sensors are commonly used in brushless DC electric motors to detect the position of the permanent magnet. For two equally spaced magnets, the voltage from the sensor will peak twice for each revolution. This arrangement is commonly used to regulate the speed of electric motors. Hall sensors are helpful to provide high starting torque in Electronically Commutated Permanent Magnet Motors, also known as ECPM motors.

Placing the Hall sensors close to the magnets is important to obtain a sufficient signal to the Hall sensors. Finding a rigid mounting for the Hall sensors close to the magnets is a challenge, particularly without compromising compact packaging of the motor.

The present invention is directed to alleviate at least some of these problems with the prior art.

BRIEF DESCRIPTION OF THE INVENTION

According to an embodiment of the invention, an electric machine is provided. The machine includes a support structure and a stator secured to the support structure. The machine also includes a rotor rotatably secured to the support structure. The rotor defines a wall of the rotor. The machine also includes a sensor secured to the support structure and adapted to cooperate with the wall of the rotor to sense the position of the rotor relative to that of the stator.

According to an aspect of the present invention, the electric machine may be provided wherein the support structure includes one of a housing and a mid shield and wherein the sensor is secured to one of the housing and the mid shield.

According to another aspect of the present invention, the electric machine may further include a circuit board secured to the support structure and may be provided wherein the sensor is secured to the circuit board.

According to a further aspect of the present invention, the electric machine may be provided wherein the sensor includes a supporting portion. The supporting portion is secured to the circuit board.

According to another aspect aspect of the present invention, the electric machine may be provided wherein the circuit board defines opposed generally planar faces and wherein the sensor extends through the circuit board from one of the planar faces to the other of the planar faces According to a further aspect of the present invention, the rotor may include a rotor core and the electric machine may further include a magnet secured to the rotor core.

According to another aspect of the present invention, the electric machine may be provided wherein the rotor core defines a first end of the core that includes at least a portion generally normal to a rotational axis of the rotor and wherein at least a portion of the magnet extends in an axial direction outwardly from the first end of the rotor core. The surface of the portion of the magnet may extend beyond the first end of the rotor core defining the wall of the rotor.

According to another aspect of the present invention, the electric machine may be provided wherein the portion of the magnet extending beyond the first end of the rotor core defines opposed inner and outer faces and wherein one of the inner face and the outer face defines the wall of the rotor.

According to another aspect of the present invention, the electric machine may be provided wherein the inner face defines the wall of the rotor.

According to another aspect of the present invention, the electric machine may be provided wherein the magnet defines the wall of the rotor.

According to another aspect of the present invention, the electric machine may be provided wherein the magnet defines a first end thereof generally normal to a rotational axis of the rotor and wherein the first end defines the wall of the rotor.

According to another aspect of the present invention, the electric machine may be provided wherein the magnet extends outwardly in an axial direction beyond the rotor core.

According to another aspect of the present invention, the electric machine may be provided wherein the magnet extends in an axial direction beyond the rotor core a distance of 0.1 to 0.5 inches.

According to another aspect of the present invention, the electric machine may be provided wherein the portion of the magnet extending beyond the rotor core defines a radial thickness, wherein the magnet extends in an axial direction beyond the rotor core an extension distance, and wherein the extension thickness is from ¼ to twice the extension distance.

According to another aspect of the present invention, the electric machine may be provided wherein the sensor defines a transducer that varies its output voltage in response to a magnetic field.

According to another embodiment of the present invention, a sensor for use in an electric machine having a support structure, stator and a rotor having a wall is provided. The sensor includes a supporting portion adapted to be secured to the support structure and a sensing portion adapted to cooperate with an inner wall of the rotor to sense the position of the rotor relative to that of the support structure.

According to another aspect of the present invention, the sensor defines a transducer that varies its output voltage in response to a magnetic field.

According to another embodiment of the present invention, a method for determining the relative position of a rotor with respect to a stator in an electric machine is provided. The method includes the steps of providing a support structure, providing a stator, securing the stator to the support structure, providing a rotor defining an inner wall thereof, rotatably securing the rotor to the support structure, providing a sensor, and securing the sensor to the support structure such that the sensor cooperates with the wall of the rotor to sense the position of the rotor relative to that of the stator.

According to another aspect of the present invention, the method further includes the steps of providing a magnet and securing the magnet to the rotor.

According to another aspect of the present invention, the method may be provided wherein the step of securing the magnet to the rotor comprises securing the magnet to the rotor such that the magnet extends in an axial direction beyond the face of the rotor such that the portion of the magnet extending beyond the face of the rotor defines the wall of the rotor.

DETAILED DESCRIPTION OF THE INVENTION

The electric machine typically includes a housing for containing and supporting a stator which is excited by an electrical source that excites an electromagnetic field in coils in the stator. The coils interact with a rotor rotatably supported in the housing to provide the mechanical rotational energy for the electrical machine.

Hall sensors are commonly used in brushless DC electric motors to detect the position of the permanent magnet. This arrangement is commonly used to regulate the speed of electric motors. Hall sensors are helpful to provide high starting torque in Electronically Commutated Permanent Magnet Motors, also known as ECPM motors.

Placing the Hall sensors close to the magnets is important to obtain a sufficient signal to the Hall sensors. Finding a rigid mounting for the Hall sensors close to the magnets is a challenge, particularly without compromising compact packaging of the motor.

Inexpensive and reliable rigid mounting for the Hall sensors close to the magnets in an electric machine is desirable in the design and manufacture of such electric machines. The method, systems and apparatus described herein facilitate inexpensive and reliable rigid mounting for the Hall sensors close to the magnets of an electric motor. Designs and methods are provided herein to facilitate inexpensive and reliable rigid mounting for the Hall sensors close to the magnets of an electric motor.

Technical effects of the methods, systems, and apparatus described herein include at least one of reduced cost, improved serviceability, improved performance and quality and reduced labor costs.

Figure 1:
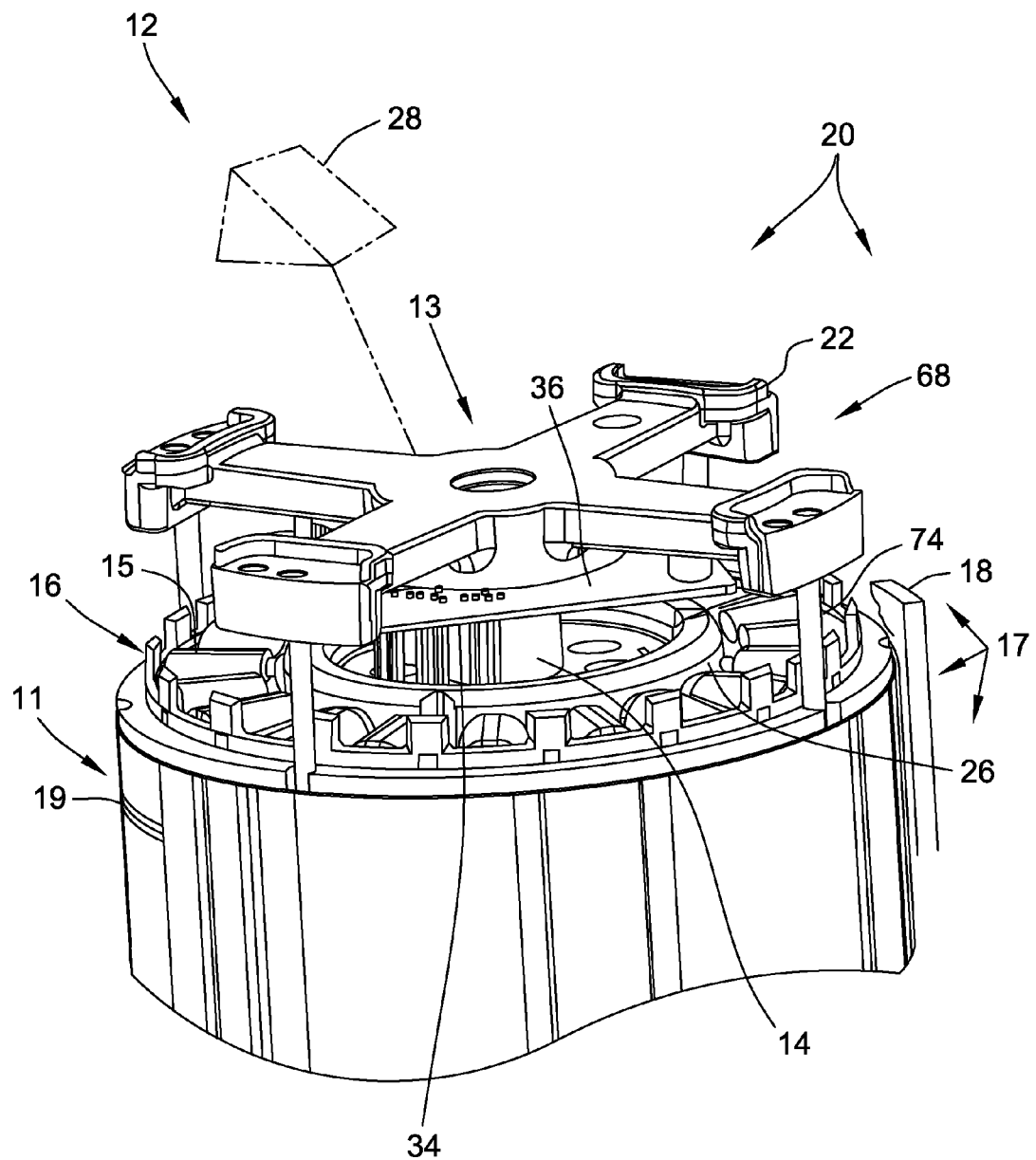
FIG. 1 is a partial perspective view of an embodiment of the present invention in the form of an electric machine.

According to an embodiment of the present invention and referring to FIG. 1, an electric machine 12 is provided. The electric machine 12 may be an electric motor or an electric generator, but hereinafter will be described as an electric motor 12. It should be appreciated that the electric motor may be used to power any mechanism, for example, a pump, a cyclic drive, a compressor, a vehicle, a fan or a blower.

The electric motor 12 typically includes a centrally located motor shaft 14 that rotates relative to the motor 12. Electrical energy applied to coils 15 within the motor 12. The coils generate an electromagnetic field that cooperates with a magnetic field in rotor 13 mounted to the motor shaft 14. The coils 15 initiate relative motion between the shaft 14 and the motor 12 that transfers the power from the coils to the shaft 14.

A stationary assembly 16, also referred to as a stator, includes stator core 11 and coils 15 or windings positioned around portions of the stator core. It is these coils to which energy is applied to initiate this relative motion which transfers the power to the shaft. These coils 15 are formed by winding wire (not shown), typically copper, aluminum or a combination thereof, about a central core to form the winding or coil. An electric current is directed through the coils 15 which induces a magnetic field. It is the magnetic field that initiates this relative motion which transfers the power to the shaft 14. The stator core 11 typically includes a plurality of stator core laminations 19 that define stator teeth 21 around which the coils 15 are wound.

Typically the motor 12 includes a housing 17 having an inner wall or surface that defines a motor cavity therein. The housing 17 may include a plurality of components and may be made of a suitable durable material, for example a metal, a polymer or a composite. The housing 17 may, as shown, include a cylindrical shell 18 and first end cap 23 and second end cap 25.

It should be appreciated that the housing of the motor may have any suitable shape. One common shape of as motor housing is that of a cylindrical solid, having a generally cylindrical cross section. The shaft on a motor with such a shape generally extends from an end of the motor.

Referring again to FIG. 1, the motor 12 may have any suitable size and shape and may be, for example, an induction motor, a permanent-split capacitor (PSC) motor, an electronically commutated motor (ECM) motor, or a switched reluctance motor. The housing 17 may include protrusions, for example fins (not shown), for dissipation of heat. The motor 12 may also include a fan (not shown) positioned within housing 17.

Figure 2:
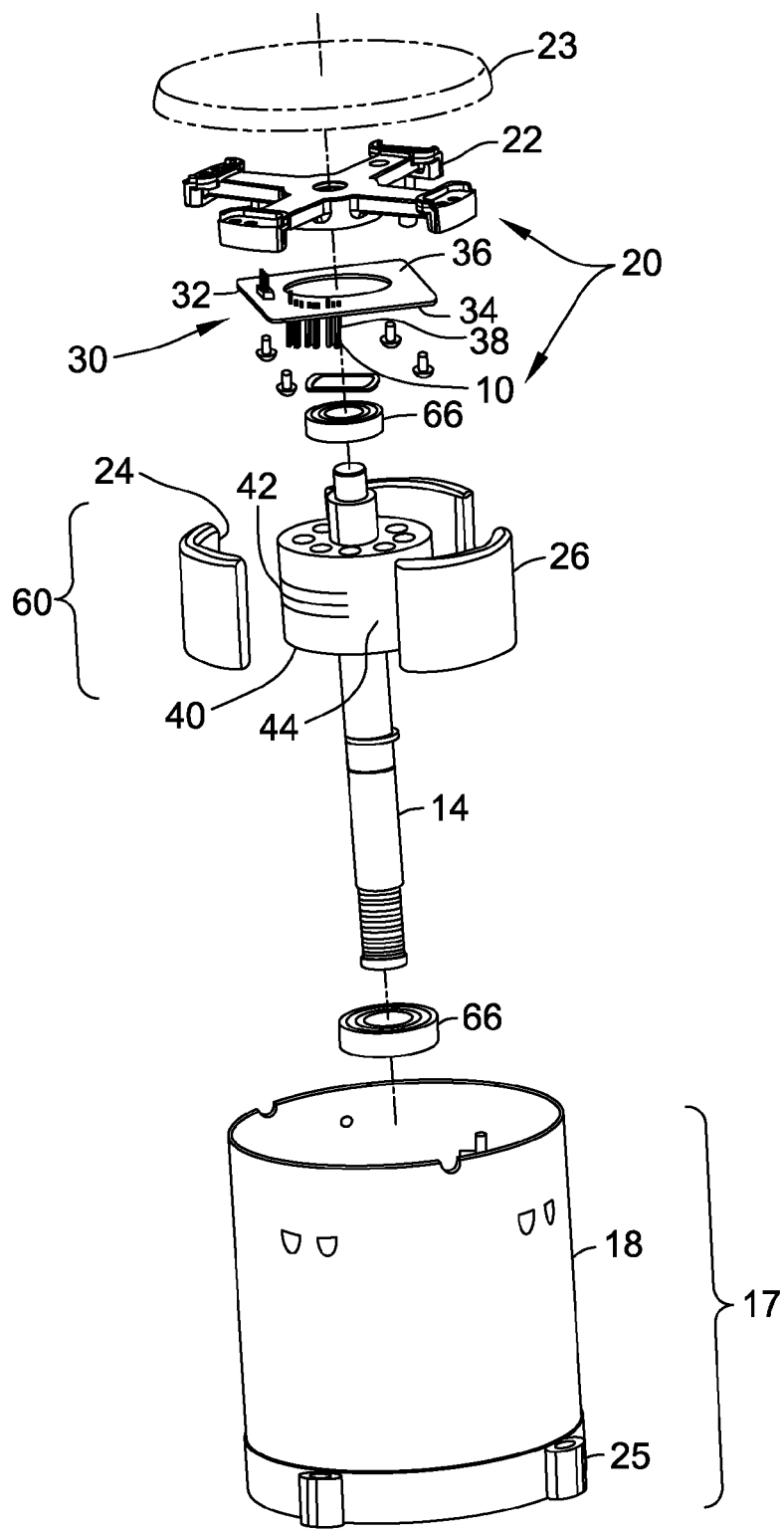
FIG. 2 is an exploded perspective view of the electric machine of FIG. 1.

As shown in FIG. 2, the motor 12 includes a sensor 10. The sensor 10 is used to detect the presence of a magnet 26 as the magnet 26 rotates in the rotor 13 pass the sensor 10. The sensor 10 can thus be used in any motor that includes magnets (and for those that produce electromagnetic fields from electromagnetic coils mounted on a rotor). Thus the sensor 10 can be used with, for example, an induction motor, a permanent-split capacitor (PSC) motor, an electronically commutated motor (ECM) motor, or a switched reluctance motor. The number of passes of the magnets 26 pass the sensor 10 in a given time can be used to determine the rotational speed of the motor. For variable speed motors the sensor 10 may be used with feedback and logic to provide for variable speed to the motors and for very accurate speed control.

ECM motors utilize electronics, including logic circuits to time commutation of the motor to obtain variable desired speeds for the motor. ECM motors may be able to provide these variable desired speeds without any sensors in the motor. Various techniques may be used to obviate the need for a sensor. However, the absence of a sensor may result in a motor with less starting torque than its intended application needs. Sensors are helpful to provide high starting torque in Electronically Commutated Permanent Magnet Motors, also known as ECPM motors.

As shown in FIG. 1, the motor 12 includes a magnet in the form of a permanent magnet 26. The sensor 10 may be used to regulate the speed of electric motors and may be used in conjunction with the control logic in ECPM motors to provide for a variable speed with high starting torque.

According to an embodiment of the invention and referring again to FIG. 1, an electric machine in the form of a motor 12 includes a support structure 20 with the stator 16 secured to the support structure 20. The machine also includes the rotor 13 rotatably secured to the support structure 20. The rotor 13 defines a wall 24 of the rotor 13. The motor 12 also includes the sensor 10 secured to the support structure 20 and adapted to cooperate with the wall 24 of the rotor to sense the position of the rotor 13 relative to that of the stator 16.

The sensor may be any sensor capable of sense the position of the rotor 13 relative to that of the stator 16. Since, as shown in FIG. 1, the motor 12 includes a magnet in the form of permanent magnet 26, the sensor can be a sensor capable of sensing a magnet field produced by the magnet 26.

One such magnet field sensing sensor is in the form of a transducer that varies its output voltage in response to the magnetic field. One such transducer is known as a Hall effect transducer or Hall effect sensor.

Figure 3:
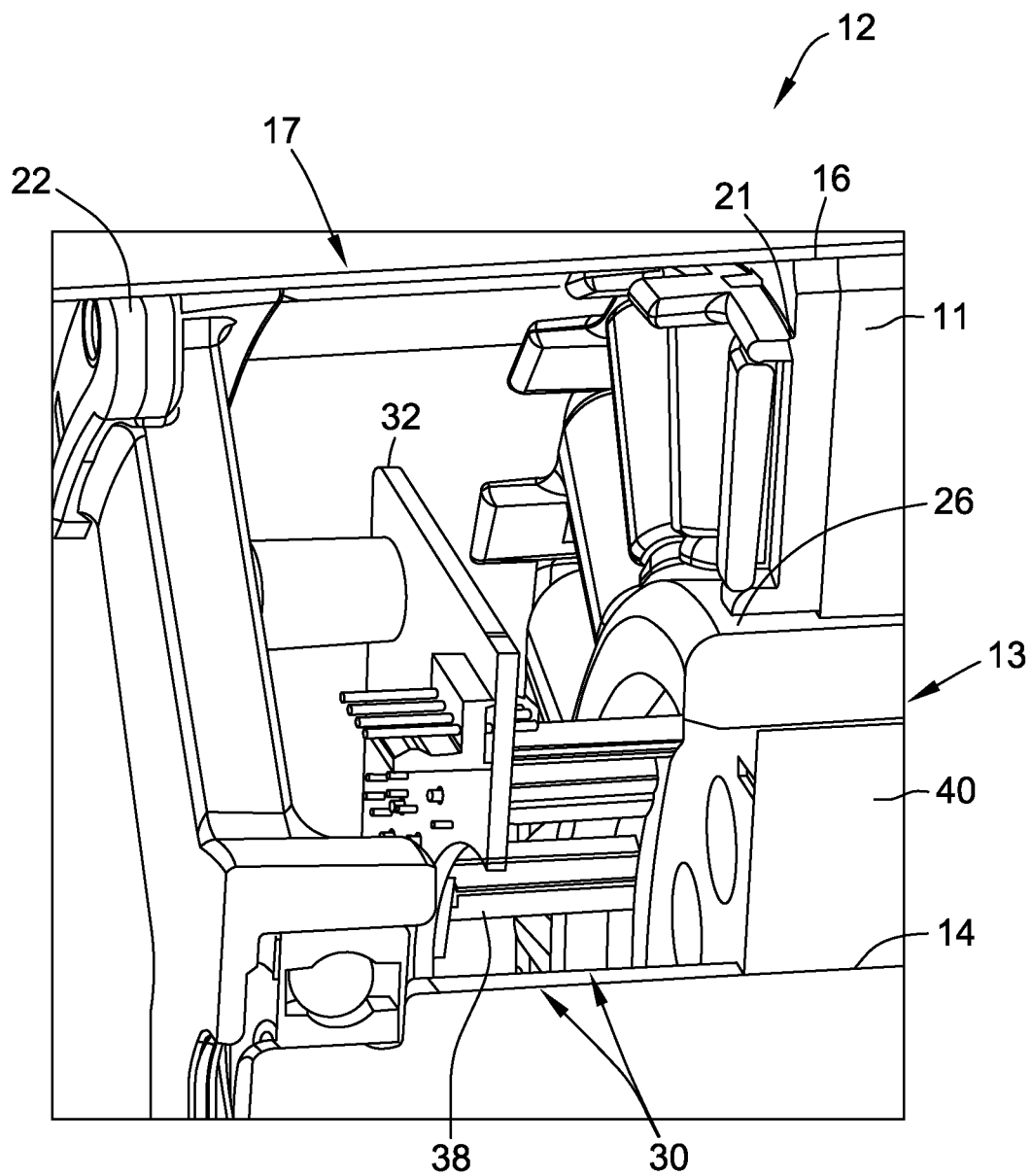
FIG. 3 is a partial perspective view of the electric machine of FIG. 1 showing the sensor assemblies in greater detail.

While the motor 12 may benefit from a solitary sensor 10, as shown in FIGS. 1-3, the motor 12 includes a plurality of sensors. As shown the motor 12 includes three sensors 10. Each of the sensors can be used to measure the magnetic field at different angular positions of the stator 16. The sensors can be equally spaced around the motor or be positioned wherever space permits.

Referring again to FIG. 2, the support structure 20 of the motor 12 may be any component or combination of components capable of providing support for other components of the motor 12. For example, the support structure 20 may include, individually or in any combination, the housing 17, the shell 18, first or upper end cap 23 (see FIG. 2), second or lower end cap 25 (see FIG. 2), the stator 16 and mid shield 22. The mid shield 22, as shown in FIG. 1, provides central support for the shell 18 and may be considered to be a part of the housing 17. The support structure may be used to separate the main functional motor components, such as rotor 13 and stator 16 from motor control circuitry or electronics 28.

The support structure 20 includes the housing 17, the shell 18, the end caps 23 and 25, the stator 16 and mid shield 22 may be made of any suitable durable materials and may, for example, be made of metals, composites or polymers. The support structure and its components may be for example, drawn, forged, stamped, cast, extruded, formed or machined. If made of a metal or metals the components may be, for example, made of iron, steel, aluminum, or a composite thereof.

As shown in FIGS. 2 and 3. The sensor 10 may be secured to the motor in any suitable fashion. The sensor 10, to cooperate with the rotor 13, is preferably fixed secured to the support structure 20, directly or indirectly. For example, the sensor 10 may be secured to the housing 17 or to the mid shield 22.

While the sensor 10 may be secured directly to the support structure 20, to more easily reach a position in close proximity to the wall 24 of the rotor 13, the motor 12 includes a sensor mount 30 to mount the sensor 10 to the support structure 20. The sensor mount 30 may be any structure to assist in positioning the sensor 10 adjacent the wall 24.

For example and as shown in FIGS. 2 and 3, sensor mount 30 may include a support plate, for example a circuit board 32. The circuit board 32 may be directly or indirectly secured to the support structure 20. The sensor 10 may be secured to the circuit board 32, either directly or indirectly.

The circuit board 32 may have any suitable shape and be made of any suitable materials. The circuit board 32 may be made of typical circuit board materials, typically a polymer. The circuit board may have a first planar surface 34 and an opposed second planar surface 36.

While the sensor 10 may be directly secured to the circuit board, to more easily reach a position in close proximity to the wall 24 of the rotor 13, as shown in FIG. 3, the sensor 10 includes a supporting portion 38 for supporting the sensor 10. The supporting portion 38 may be secured to the circuit board 32. The supporting portion 38 may be considered a portion of the circuit board or as an entirely separate component.

It should be appreciated that the supporting portion 38 may extend from the first planar surface 34, or as shown, the supporting portion 38 may extend through the circuit board 32 from the first planar faces 34 to the second planar face 36.

Figure 4:
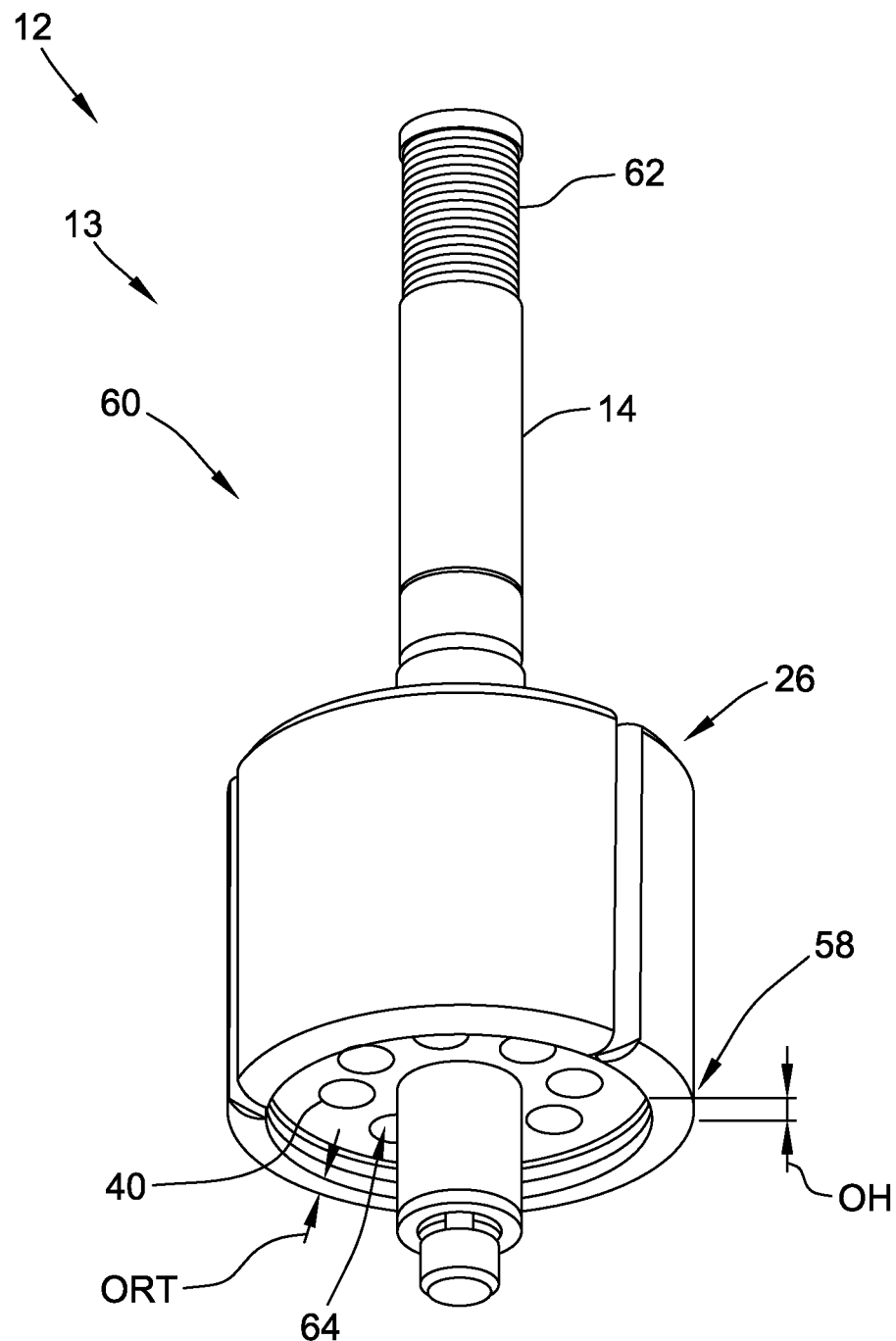
FIG. 4 is a perspective view of the rotor of the electric machine of FIG. 1.

As shown in FIGS. 2 and 4, the electric motor 12 may further include the magnet 26 secured to the rotor 13. While a solitary magnet 26 may be used, the number of magnets should correspond by a formula to the number of coils 15 in the stator 16 and the number of phases of the motor 12. For example and as shown in FIGS. 1-9, the motor 12 is a three phase motor and has three magnets 26 and coils 15.

Referring to FIG. 4, the magnets 26 may be any made of any material that may be permanently magnetized and may, for example, be made of ferrite or of a rare earth material, such as neodymium. The magnets 26 are positioned on rotor core 40 which may be made of rotor laminations 42 fitted onto motor shaft 14. The magnets 26 may be secured by for example fasteners, tabs or other mechanical mechanism or may be secured by adhesives.

The magnets may have any suitable shape and are, as shown in FIG. 4, since they are positioned on the cylindrical periphery 44 of the rotor core 40, have an arcuate shape comforming to the cylindrical periphery 44 of the rotor core 40. The magnets 26 may extend over most of the periphery 44 of the rotor core 40.

As shown in FIGS. 2 and 4, the electric motor 12 includes the rotor 13 which defines face 24 of rotor 13. The face 24 of rotor 13 cooperates with the sensor 10 to determine the angular position of the rotor 13 with respect to the stator 16.

As shown in FIGS. 2 and 4, the face 24 that cooperates with the sensor 10 is a part of magnet 26. The closer the magnet is to the sensor, the stronger the magnetic force and the resulting magnetic signal to the sensor. Thus, there is an advantage in making the magnet very close to the sensor.

Figure 3A:
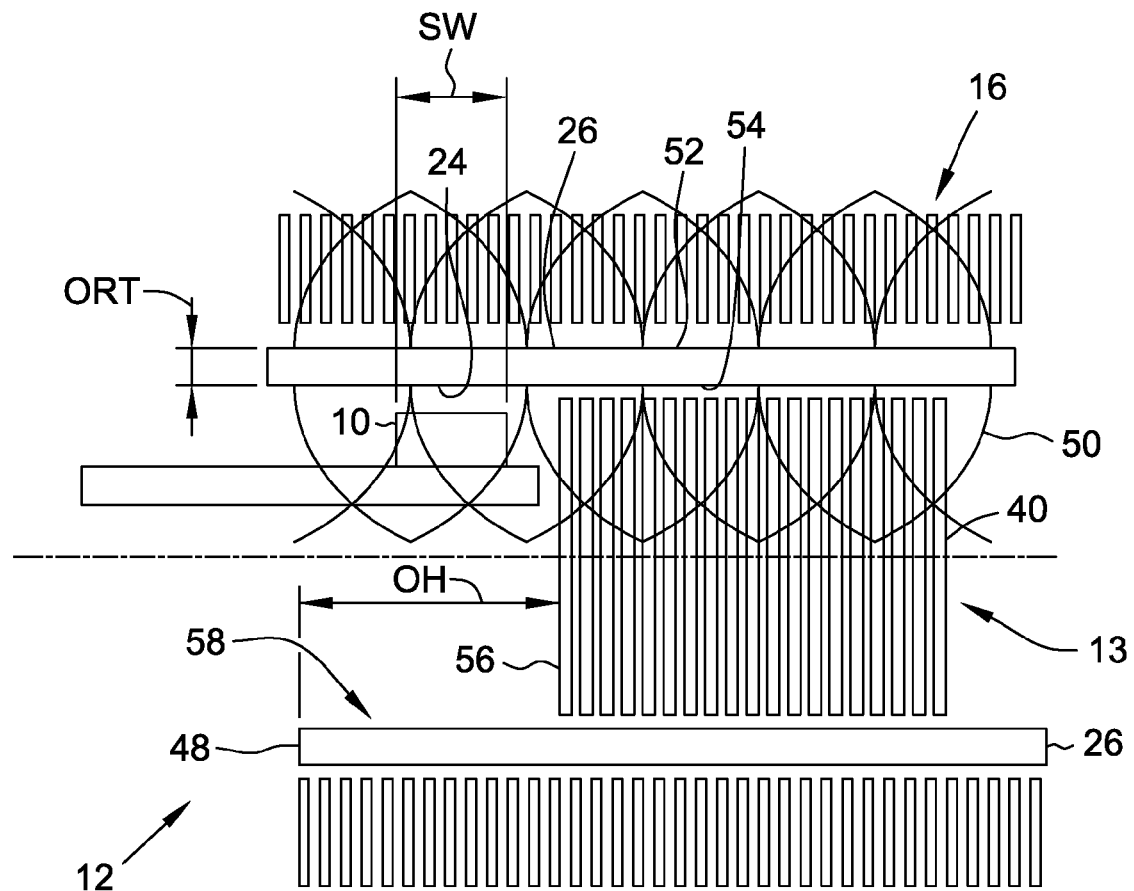
FIG. 3A is a partial cross sectional view of the electric machine of FIG. 1 showing the sensor in close cooperation with the inner periphery magnet of the rotor.
Figure 3B:
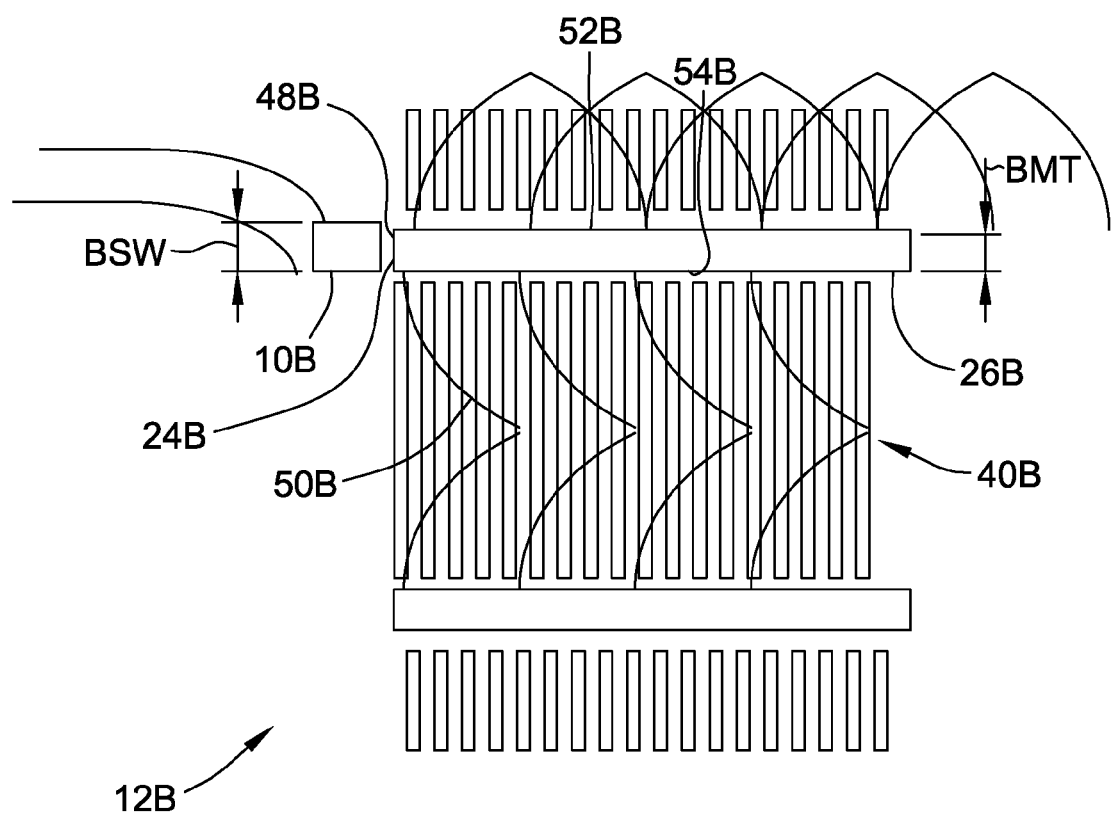
FIG. 3B is a partial cross sectional view of another embodiment of an electric machine according to the present invention showing the sensor in close cooperation with the end of the magnet of the rotor.
Figure 3C:
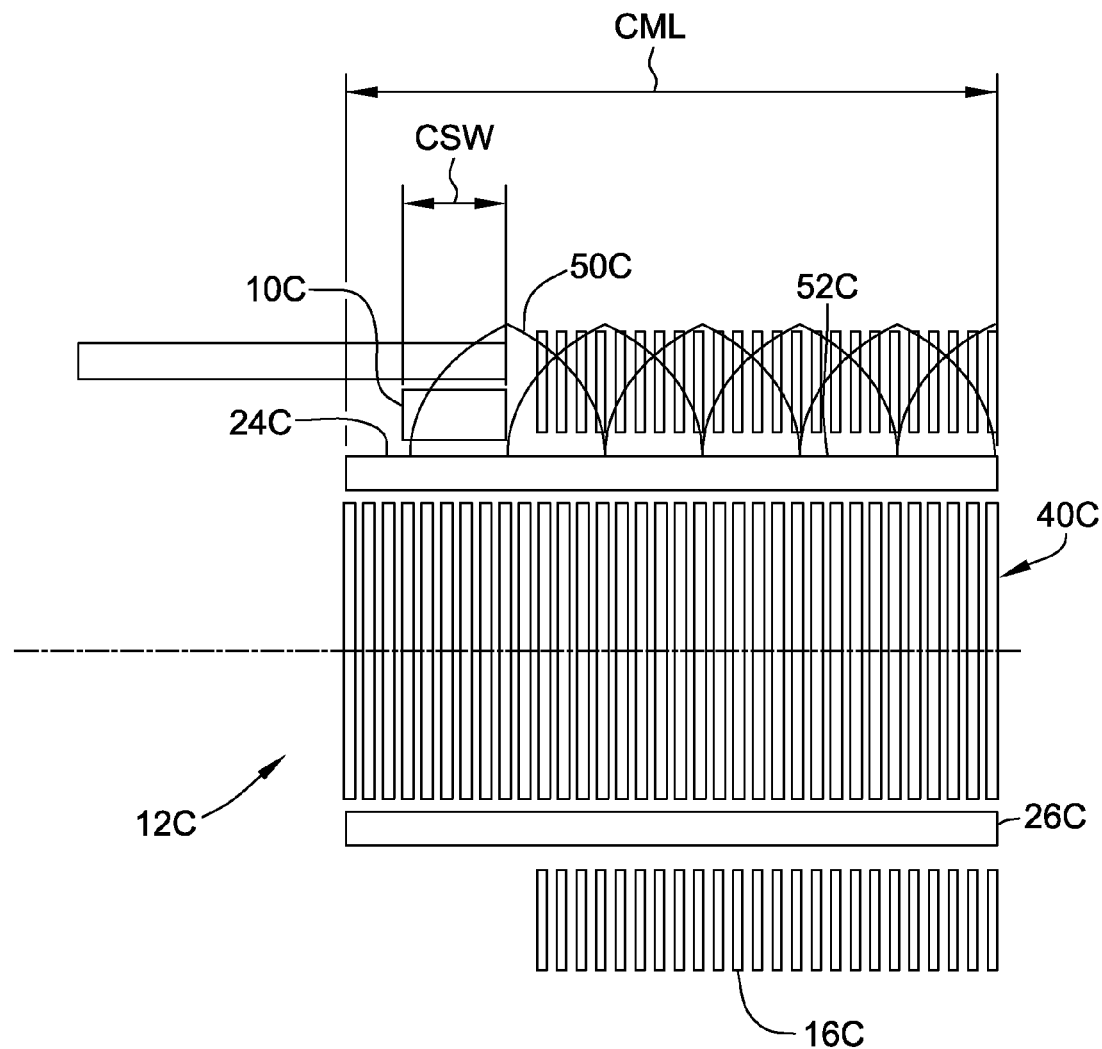
FIG. 3C is a partial cross sectional view of the electric machine of FIG. 1 showing the sensor in close cooperation with the outer periphery of the magnet of the rotor.

As shown in FIGS. 3A, 3B and 3C, the face that cooperates with the sensor may be positioned at different locations on the magnet.

Figure 5:
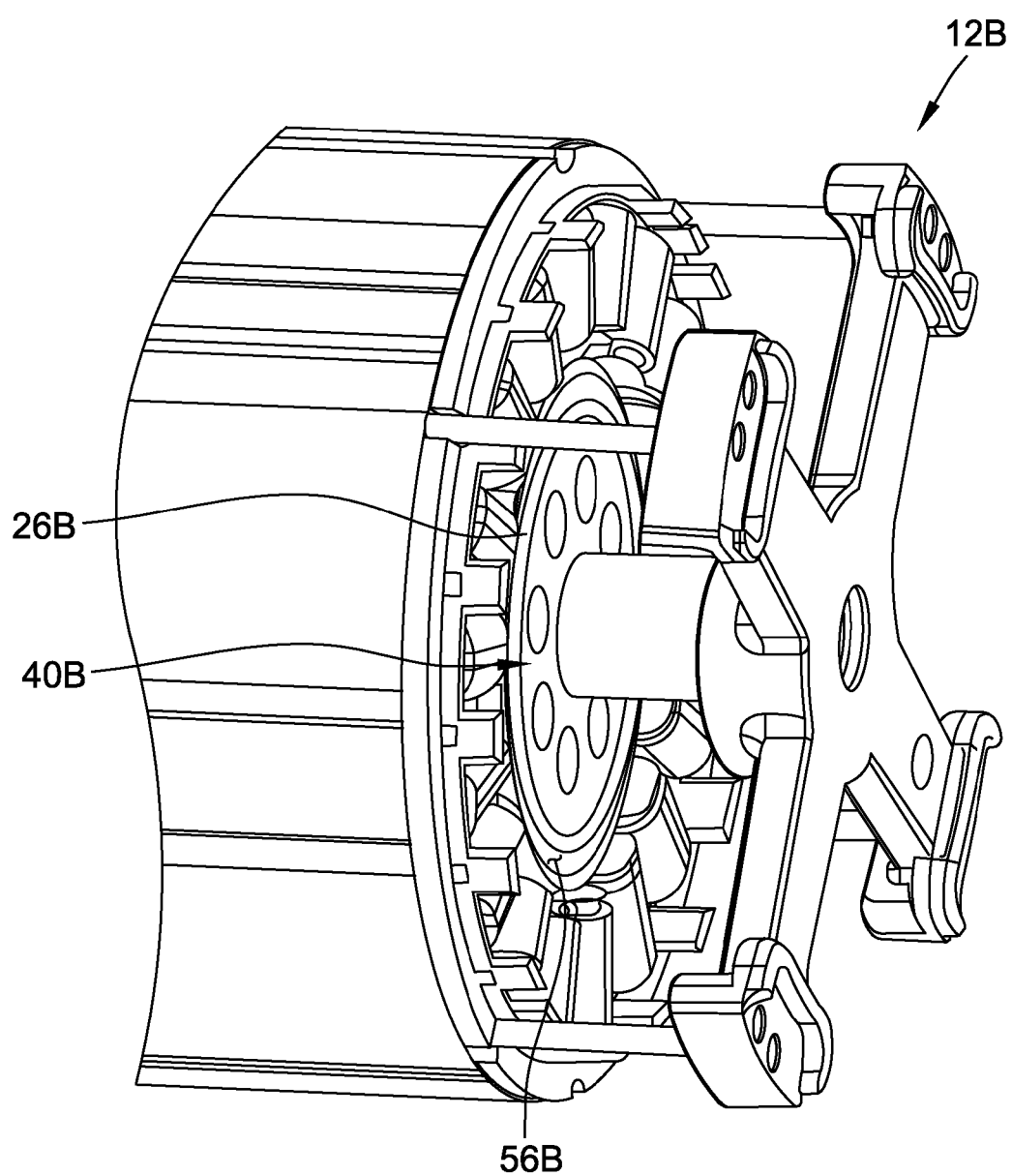
FIG. 5 is a perspective view of the electric machine of FIG. 3B showing the rotor without overhung magnets.

For example and as shown in FIG. 3B and FIG. 5, another embodiment of the invention is shown as electric motor 12B in which sensor 10B is positioned adjacent an end face 48B of magnet 26B mounted onto rotor core 40B. The end face 48B serves as the rotor face 24B and cooperates with the sensor 10B. While this arrangement may provide for a conveying of signal from the magnet 26B to the sensor 10B, the signal may be weak since the magnet 26B transmits its magnetic field along flux lines 50B that are more dense along inner periphery 52B of the magnet 26B and along outer periphery 54B of the magnet 26B than along the end face 48B of magnet 26B. Further the sensor 10B has a sensor width BSW that may be greater than the magnet thickness BMT further reducing the signal strength.

Referring now to FIG. 5, the motor 12B is shown with the sensor removed. Since the sensor is positioned adjacent an end face 48B of magnet 26B mounted onto rotor core 40B, the magnet 26B needs not extend past outer face 56B of rotor core 40B.

For example and as shown in FIG. 3C another embodiment of the invention is shown as electric motor 12C in which sensor 10C is positioned adjacent an outer face or outer periphery 52C of magnet 26C mounted onto rotor core 40C. The outer face 52C serves as the rotor face 24C and cooperates with the sensor 10C. This arrangement may provide for an improved conveying of signal from the magnet 26C to the sensor 10C, as the signal may be stronger, since the magnet 26C transmits its magnetic field along flux lines 50C that are more dense along outer periphery 52C of the magnet 26C than along the end face 48B of magnet 26B of FIG. 3B. Further the sensor 10C has a sensor width CSW that less than the magnet length CML further improving the signal strength. This arrangement however requires that the stator 16C be narrower to accommodate locating of the sensor 10C on the outer face 52C of magnet 26C.

As shown in FIGS. 1-3 and 4-8 and referring now to FIG. 3A the sensor 10 of electric motor 12 is shown positioned adjacent an inner face or inner periphery 54 of magnet 26 mounted onto rotor core 40. The inner face 54 serves as the rotor face 24 and cooperates with the sensor 10. This arrangement provides for an improved signal conveyed from the magnet 26 to the sensor 10, as the signal is stronger since the magnet 26 transmits its magnetic field along flux lines 50 that are more dense along inner face or inner periphery 54 of the magnet 26 than along the end face 48B of magnet 26B of FIG. 3B. Further the sensor 10 has a sensor width SW that less than the magnet length ML further improving the signal strength. This arrangement has the benefit over the motor 12C of FIG. 3C of not requiring that the stator 16C be narrower to accommodate locating of the sensor 10 on the outer face 50 of magnet 26. The rotor core 40, however, must be shortened to provide a location for the sensor 10.

As shown in FIGS. 3 and 3A, the magnet 26 extends in an axial direction beyond outer face 56 of the rotor core 40 to form magnet overhung portion 58. The magnet overhung portion 58 permits the sensor 10 to be optionally positioned adjacent either the outer face 52 of magnet 26 or against inner face 54 of magnet 26. The magnet overhung portion 58 is defined by an axially extending overhung length OH from end face 48 of magnet 26 to the outer face 56 of the rotor core 40. The overhung length OH is preferably selected to provide a sufficient magnetic flux and resultant magnetic field signal to provide a sufficiently strong signal to the sensor 10 to properly measure the rotational position of the rotor 13 with respect to the stator 16. The overhung length OH is further preferably selected with consideration of keeping the axial length of the motor from becoming too great.

For example, the overhung length OH may be distance of 0.1 to 0.5 inches, a distance of greater than 0.2 inches, a distance of less than 1 inch, a distance of less than 0.5 inches or a distance of less than 1.0 inch.

The electric motor 12 may be provided wherein the portion of the magnet extending beyond the outer face 56 of the rotor core 40 defines an overhung radial thickness ORT from inner face 54 to outer face 52. The overhung radial thickness ORT of the magnet 26, may, for example, be from one fourth to six times the overhung length OH, from one tenth to one half the overhung length OH, greater than one tenth the overhung length OH, or less than one half the overhung length OH of the magnet 26.

Referring again to FIG. 4 rotor assembly 60 is shown. The rotor assembly 60 is used in motor 12 of FIGS. 1-3. The rotor assembly 60 includes shaft 14. The shaft 14 may, as shown be generally cylindrical and may include external threads 62 for assistance in securing, for example, a pulley, sheave or gear to drive mechanism (not shown). The shaft 14 serves to support the rotor core 40 which, as shown, may be made of a series of rotor core laminations 42. The shaft 12 and rotor core 40 may be made of any suitable materials by any suitable manufacturing process. The shaft 12 may for example be formed or machined from a metal and the laminations 42 may be stamped from sheet metal. The rotor core laminations 42 may include voids or passageway 64 that may be circular or have any other shape. The passageways reduce material weight and provide for a fluid path for cooling of the rotor core 40.

Referring again to FIG. 2, the rotor assembly 60 is shown in an exploded view of the motor 12. The rotor assembly 60 is secured to motor 12 by a pair of bearings 66 mounted respectively to lower end cap 21 and midshield 22.

Figure 6:
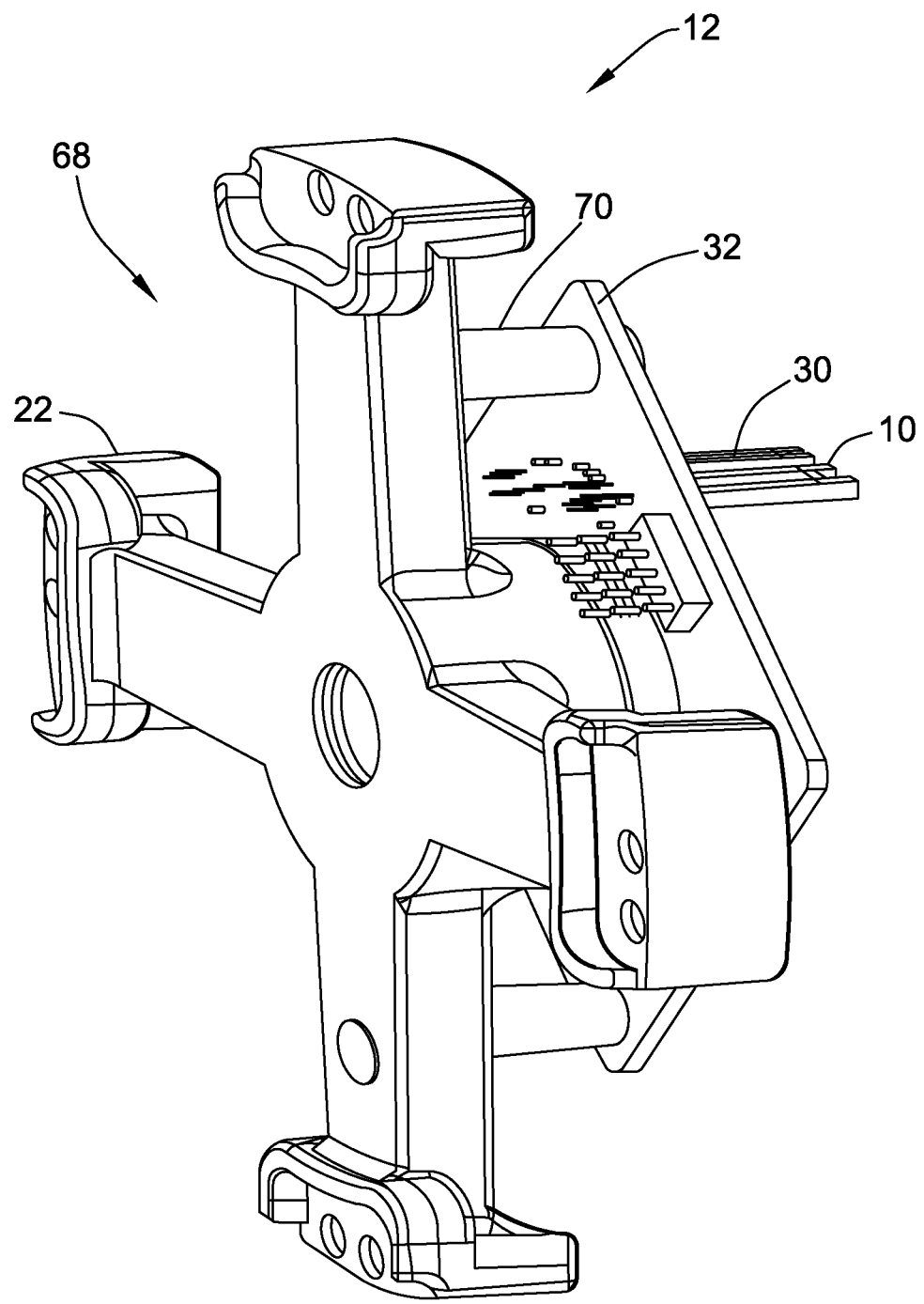
FIG. 6 is a perspective view of a midshield subassembly for use in the electric machine of FIG. 1 including a midshield and a circuit board.
Figure 7:
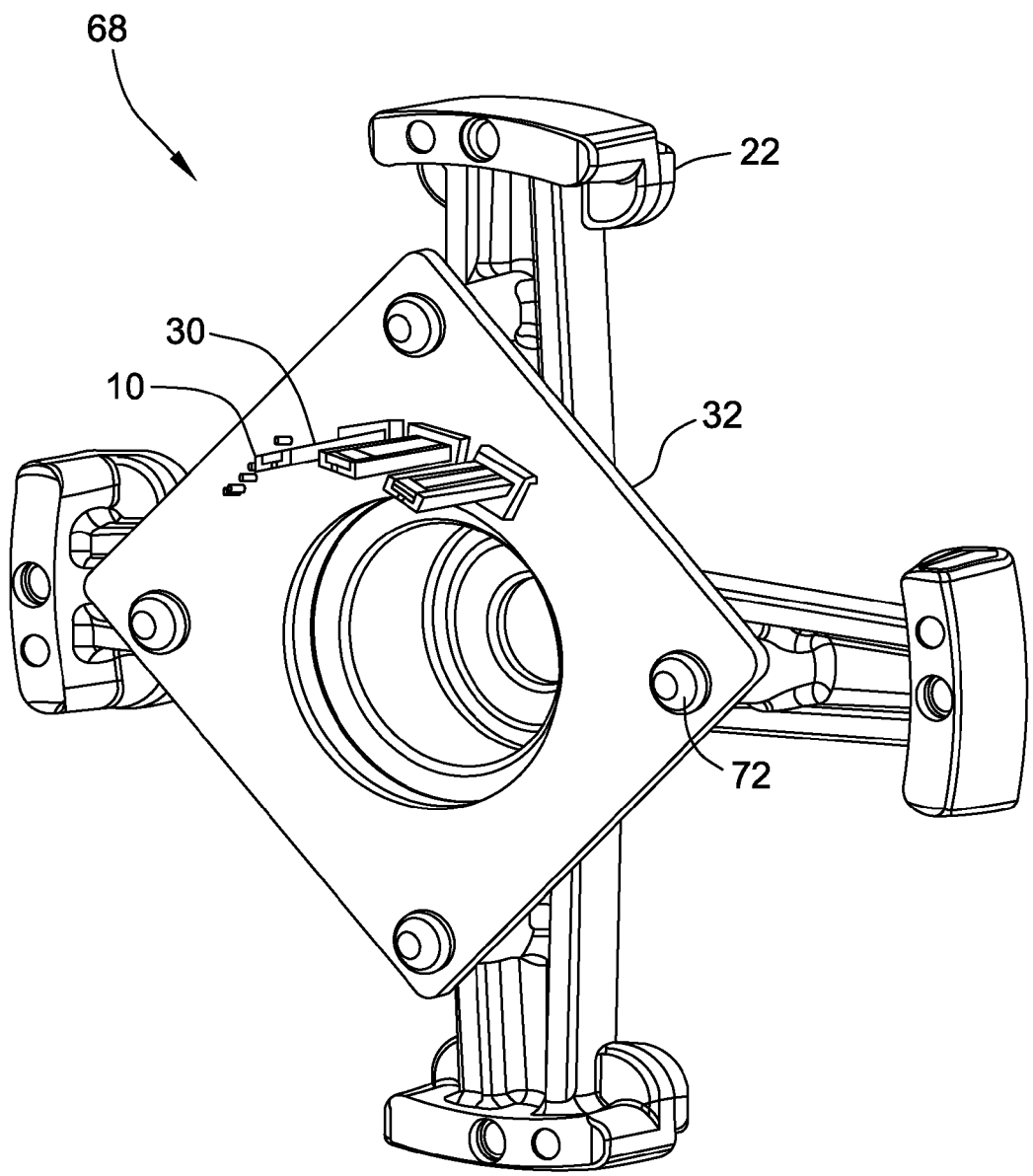
FIG. 7 is another perspective view of the midshield subassembly of FIG. 6.

Referring now to FIGS. 6 and 7 midshield assembly 68 is shown. The midshield assembly 68 is used in motor 12 of FIGS. 1-3. The midshield assembly 68 includes midshield 22 and a circuit board 32 secured to the midshield 22. The circuit board 32 may be directly connected to midshield 22, or as shown, the midshield assembly 68 may include risers 70 to position the circuit board 32 in a spaced apart relationship with the midshield 22. As shown the sensors 10 are supported by circuit board 32 directly, or as shown by the sensor mounts 30.

The midshield 22 may be made of any durable material by any manufacturing process, for example the midshield may be cast from an aluminum alloy. The circuit board 32 may be made of any durable material by any manufacturing process, for example, the circuit board 32 may be made of a polymer or a composite. The circuit board 32 may be secured in any fashion to the midshield and may as shown be secured by fasteners, for example by screws 72.

Referring again to FIG. 1 the midshield assembly 68 may be secured to the motor 12 at the shell 18 and by axially extending fasteners 74 extending from the lower end cap 21 to the midshield 22.

Figure 8:
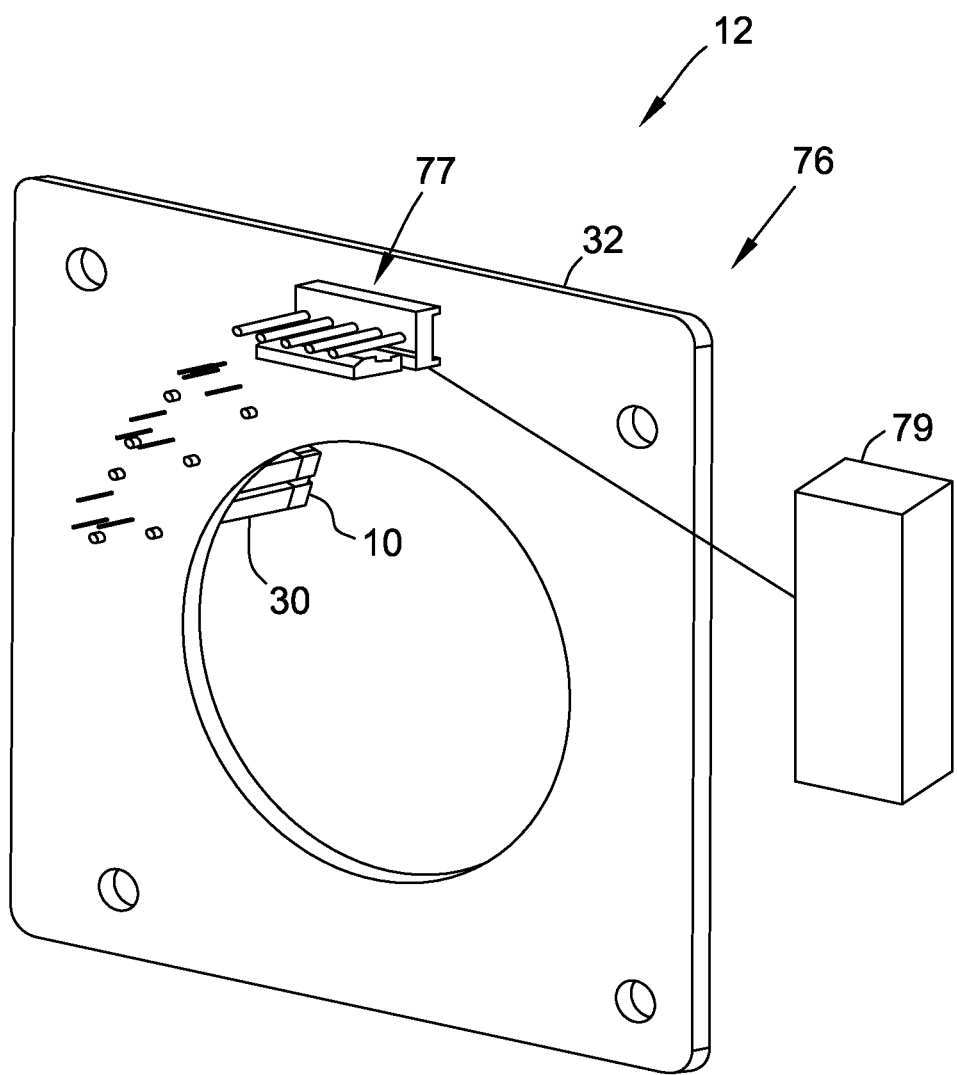
FIG. 8 a perspective view of a circuit board subassembly for use in the electric machine of FIG. 1.
Figure 9:
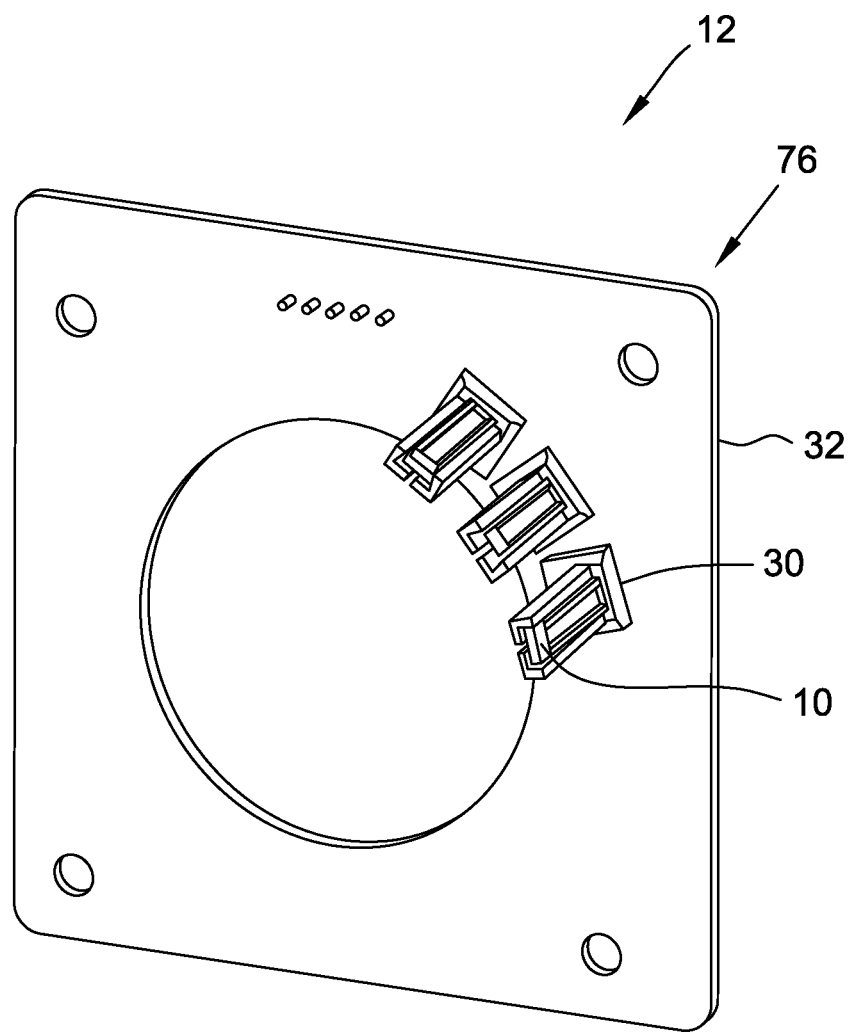
FIG. 9 is another perspective view of the circuit board subassembly of FIG. 8 showing the sensors in greater detail.

Referring now to FIGS. 8 and 9 circuit board assembly 76 is shown. The circuit board assembly 76 is used in motor 12 of FIGS. 1-3. The circuit board assembly 76 includes circuit board 32 from which sensor mounts 30 extend. Sensors 10 are mounted on sensor mounts 30. A wiring harness 77 may be mounted to the circuit board 32 and may be used to electrically connect the sensors 10 to motor controller 79.

Figure 10:
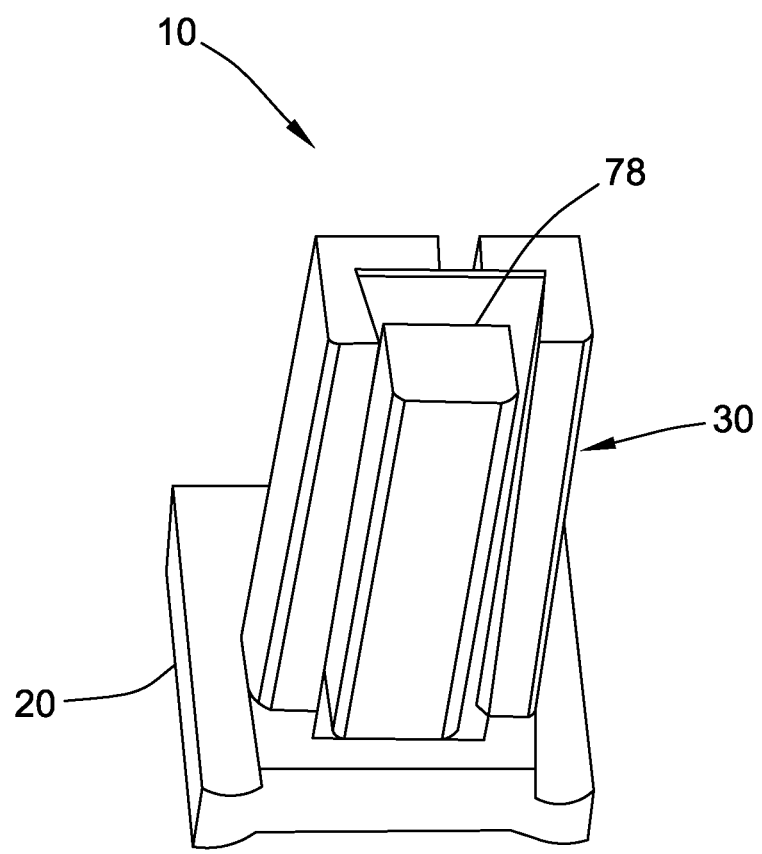
FIG. 10 is a perspective view of a sensor subassembly for use in the electric machine of FIG. 1.

Referring now to FIG. 10, the sensor 10 for use in an electric motor 12 is shown. The sensor 10 is utilized in the electric motor 12 of FIGS. 1-3. The electric motor 12 has a support structure 20, stator 16 and a rotor 13 having a wall 24 (see FIG. 1). The sensor 10 includes a supporting portion or sensor mount 30 adapted to be secured to the support structure 20 and a sensing portion 78 adapted to cooperate with the wall 24 of the rotor 13 to sense the position of the rotor 13 relative to that of the support structure 20. The sensor 10 may be any sensor capable of sensing a magnetic field. For example the sensor 10 may be a transducer that varies its output voltage in response to a magnetic field, for example a Hall effect transducer or sensor.

Figure 11:
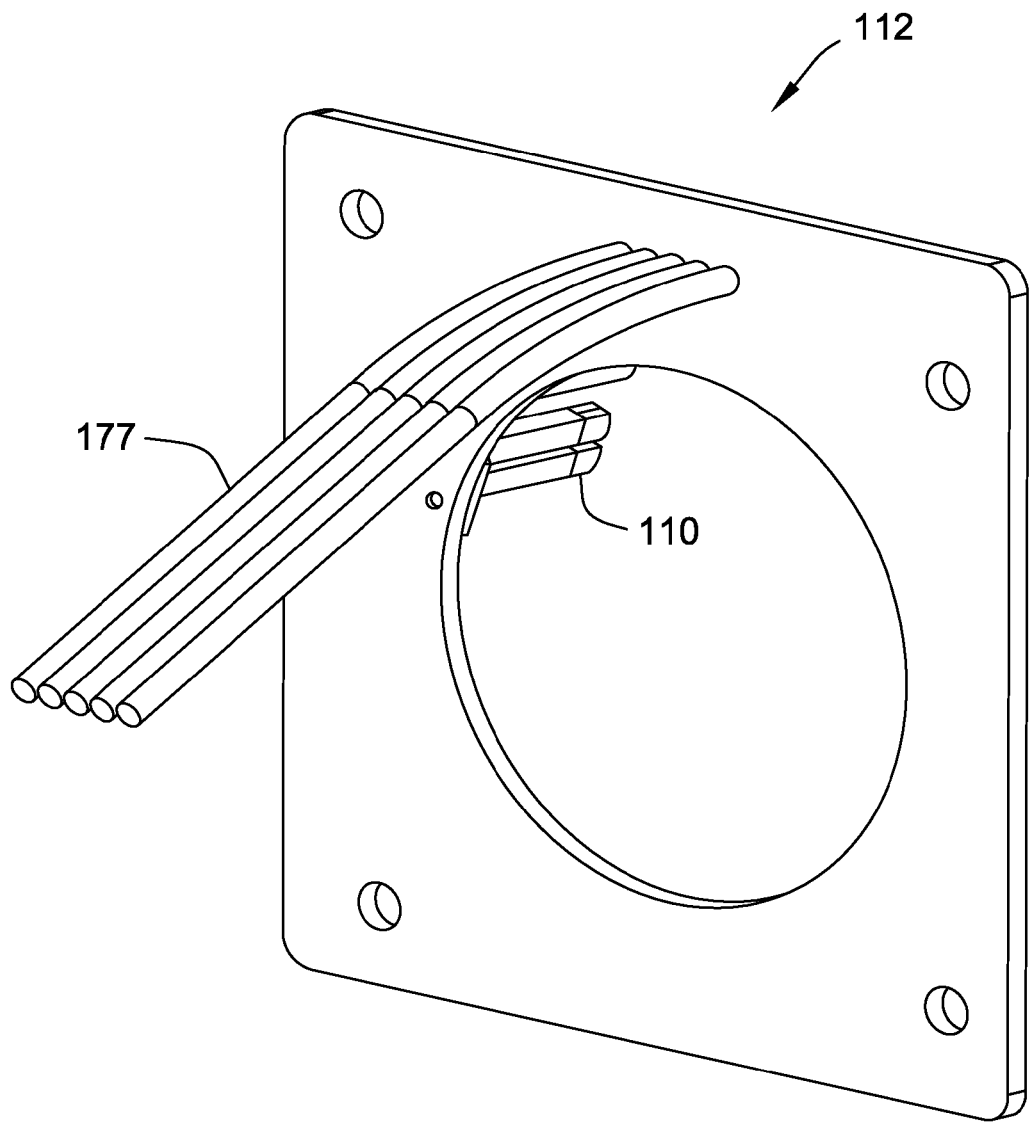
FIG. 11 is a perspective view of another embodiment of the present invention in the form of an electric machine with a individual wires instead of a wiring harness.

Referring now to FIG. 11 another embodiment of the present invention is shown in the form of electric motor 112. The electric motor 112 is similar to motor 12 of FIGS. 1-4, except electric motor 112 includes individual wires 177 instead of a wiring harness, like wiring harness 77 of the motor 12 of FIG. 10.

Figure 12:
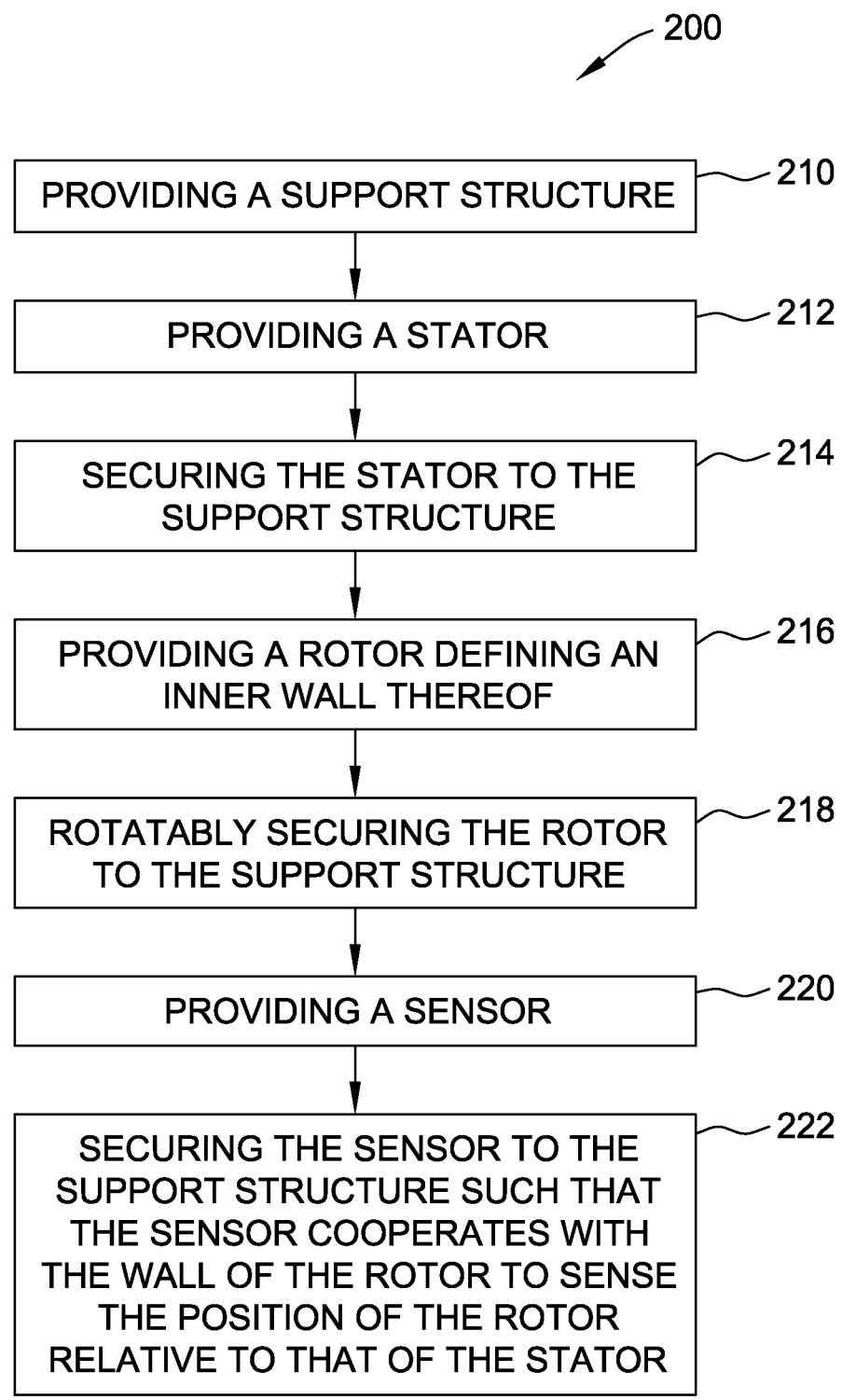
FIG. 12 is a flow chart of another embodiment of the present invention in the form of a method for providing an electric machine.

Referring now to FIG. 12, another embodiment of the present invention is shown in the form of method 200. The method 200 is used for determining the relative position of a rotor with respect to a stator in an electric machine. The method includes step 210 of providing a support structure and step 212 of providing a stator. The method further includes step 214 of securing the stator to the support structure and step 216 providing a rotor defining an inner wall thereof. The method also includes step 218 of rotatably securing the rotor to the support structure and step 220 of providing a sensor. The method also includes step 222 of securing the sensor to the support structure such that the sensor cooperates with the wall of the rotor to sense the position of the rotor relative to that of the stator.

According to another aspect of the present invention, the method 200 may further include a step of providing a magnet and a step of securing the magnet to the rotor.

According to another aspect of the present invention, the method may be provided wherein the step of securing the magnet to the rotor comprises securing the magnet to the rotor such that the magnet extends in an axial direction beyond the face of the rotor such that the portion of the magnet extending beyond the face of the rotor defines the wall of the rotor.

The methods, systems, and apparatus described herein facilitate efficient and economical assembly of an electric machine. Exemplary embodiments of methods, systems, and apparatus are described and/or illustrated herein in detail. The methods, systems, and apparatus are not limited to the specific embodiments described herein, but rather, components of each apparatus and system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "the" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Described herein are exemplary methods, systems and apparatus utilizing lower cost materials in a permanent magnet machine that reduces or eliminates the efficiency loss caused by the lower cost material. Furthermore, the exemplary methods system and apparatus achieve increased efficiency while reducing or eliminating an increase of the length of the machine. The methods, system and apparatus described herein may be used in any suitable application. However, they are particularly suited for HVAC and pump applications.

Exemplary embodiments of the fluid flow device and system are described above in detail. The electric machine and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only in accordance with the principles of the disclosure, any feature of a drawing may be referenced and/or claimed in combination with any feature of any other drawing.

This written description uses examples to disclose invention. In the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electric machine, comprising:
a support structure;
a circuit board secured to said support structure;
a stator secured to said support structure;
a rotor rotatably secured to said support structure, said rotor defining an axis of rotation thereof, said rotor defining a wall thereof, said rotor includes a rotor core and further comprising a magnet secured to said rotor core; and
a sensor secured to said circuit board and adapted to cooperate with said magnet to sense the position of the rotor relative to that of said stator, wherein said magnet extends outwardly in a direction parallel to the axis of rotation of the rotor beyond the rotor core, wherein said sensor defines a sensor surface thereof, wherein said magnet defines a sensor cooperating surface thereof, and wherein the sensor surface of said sensor and the sensor cooperating surface of said magnet face each other with no other elements between each other, wherein the portion of said magnet extending beyond said rotor core defines opposed inner and outer magnet surfaces; and wherein one of the inner magnet surface and the outer magnet surface defines sensor cooperating surface of said magnet.

2. The machine as in claim 1, wherein the outer magnet surface defines the sensor cooperating surface of said magnet.

3. The machine as in claim 1, wherein the inner magnet surface defines the sensor cooperating surface of said magnet.

4. An electric machine, comprising:
a support structure;
a circuit board secured to said support structure;
a stator secured to said support structure;
a rotor rotatably secured to said support structure, said rotor defining an axis of rotation thereof, said rotor includes a rotor core having an end face and further comprising a magnet secured to said rotor core; and
a sensor secured to said circuit board and adapted to cooperate with said magnet to sense the position of the rotor relative to that of said stator, wherein said sensor defines a sensor surface thereof, wherein said magnet defines a sensor cooperating surface thereof, and wherein the sensor surface of said sensor and the sensor cooperating surface of said magnet face each other with no other elements between each other; wherein the magnet defines a first end thereof generally normal to the axis of rotation of said rotor; wherein the end face of said magnet defines the sensor cooperating surface of said magnet; wherein the portion of said magnet extending beyond the end face of the rotor core defines a convex outer magnet surface; and wherein the convex outer magnet surface defines the sensor cooperating surface of said magnet.

5. An electric machine, comprising:
a support structure;
a circuit board secured to said support structure;
a stator secured to said support structure;
a rotor rotatably secured to said support structure, said rotor defining an axis of rotation thereof, said rotor includes a rotor core having an end face and further comprising a magnet secured to said rotor core; and
a sensor secured to said circuit board and adapted to cooperate with said magnet to sense the position of the rotor relative to that of said stator, wherein said sensor defines a sensor surface thereof, wherein said magnet defines a sensor cooperating surface thereof, and wherein the sensor surface of said sensor and the sensor cooperating surface of said magnet face each other with no other elements between each other; wherein the magnet defines a first end thereof generally normal to the axis of rotation of said rotor; wherein the end face of said magnet defines the sensor cooperating surface of said magnet; wherein the portion of said magnet extending beyond end face of the rotor core defines a concave magnetic surface; and wherein the concave magnetic surface defines the sensor cooperating surface of said magnet.

* * * * *